United States Patent [19]
Toro

[11] 3,740,623
[45] June 19, 1973

[54] SELF-HEALING NON-METALLIZED POLYSTYRENE CAPACITOR

[75] Inventor: Joseph A. Toro, Ogallala, Nebr.

[73] Assignee: TRW Inc., Cleveland, Ohio

[22] Filed: Jan. 14, 1972

[21] Appl. No.: 217,980

Related U.S. Application Data

[63] Continuation-in-part of Ser. No. 93,735, Nov. 30, 1970, abandoned.

[52] U.S. Cl. .................................. 317/258, 317/260
[51] Int. Cl. ............................................. H01g 3/215
[58] Field of Search ............................. 317/258, 260

[56] References Cited
UNITED STATES PATENTS
| | | | |
|---|---|---|---|
| 3,215,909 | 11/1965 | Schill | 317/258 |
| 3,346,789 | 10/1967 | Robinson | 317/258 |
| 3,588,643 | 6/1971 | Ross | 317/260 X |

OTHER PUBLICATIONS

Birks J. B. Modern Dielectric Materials London Heywood & Co., 1960, pp. 106–107

Primary Examiner—E. A. Goldberg
Attorney—Carlton Hill, Charles F. Meroni and J. Arthur Gross et al.

[57] ABSTRACT

A self-healing capacitor made by forming carrier electrodes by metallizing both surfaces of a polycarbonate film without margins, convoluting two carrier electrodes with a polystyrene dielectric film therebetween and with the side edges of the two carrier electrodes offset from each other, and then metal spraying the side edges of the convolute to conductively join the metallized coatings on the opposite surfaces of the carrier electrodes.

2 Claims, 4 Drawing Figures

Patented June 19, 1973

3,740,623

3,740,623

SELF-HEALING NON-METALLIZED POLYSTYRENE CAPACITOR

CROSS-REFERENCE TO RELATED APPLICATION

The present application is a continuation in part of my pending application Ser. No. 93,735, filed Nov. 30, 1970 now abandoned.

SUMMARY OF THE INVENTION

It is the object of the invention to provide a self-healing capacitor which avoids or mitigates the short circuit problem common in polystyrenefoil designed capacitors.

A further object of the invention is to provide capacitors for higher voltage applications than is practical with standard foil design capacitors of equal thickness of dielectric.

Another object of the invention is to provide an economical method of manufacturing capacitors of large capacity value.

Still another object of the invention is to provide a novel carrier electrode for use in the manufacture of capacitors.

A further object of the invention is to provide self-healing capacitors by metallizing both surfaces of a polycarbonate film from edge to edge to form carrier electrodes, convoluting two such carrier electrodes with a polystyrene dielectric film therebetween, with the edges of the two carrier electrodes offset from each other and metal spraying the side edges of the resulting convolute so as to conductively join the metallized coatings on the two surfaces of the carrier electrodes, thereby providing a capacitor with a capacitance value capable of a temperature stability of $-50 \pm 50$ parts per million per degree Centigrade over a temperature range from 0° C to 70° C.

DETAILED DESCRIPTION OF THE INVENTION

Figure 1:
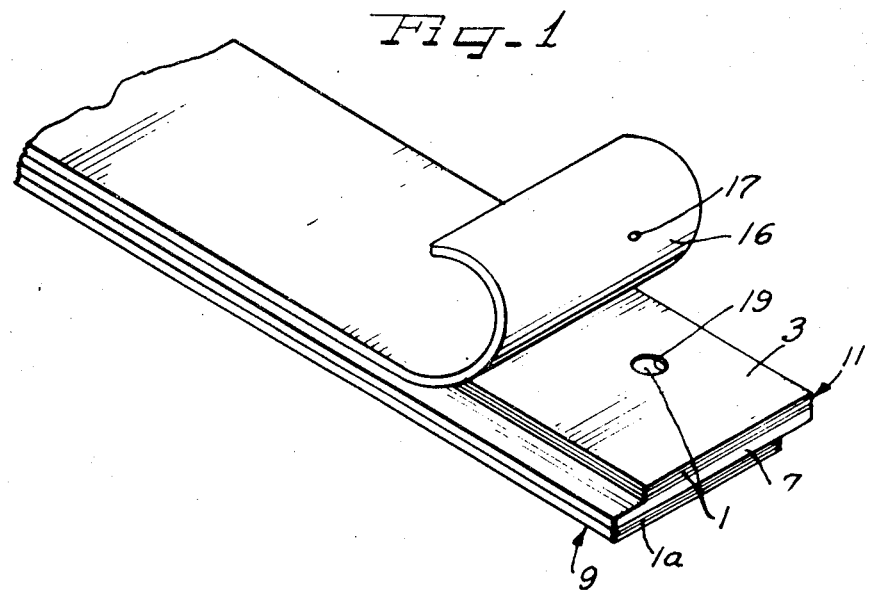
FIG. 1 is a perspective view of a portion of a carrier electrode made in accordance with the invention, overlaid by a polystyrene dielectric film partially turned back to illustrate the self-healing property of a capacitor made with such carrier electrodes.

Referring to the drawing, numerals 1 and 1a indicate sheets of polycarbonate material having high dielectric strength and low power factor, such as polycarbonates of tetrachlorobisphenol A, or other polycarbonates disclosed in U. S. Pat. No. 3,328,654. The polycarbonate film may have a thickness of approximately 0.15 to 0.5 mil and including a thickness of 0.14 mil, for example, and may be of any suitable width, depending on the size of the desired capacitor.

The polycarbonate film, is metallized on both surfaces from edge to edge by a suitable conductive metal such as aluminum, zinc, gold, or silver. Metallization may be carried out by spraying, vapor deposition or other conventional method. The plastic film is metallized completely from edge to edge, as indicated by the numeral 3, and the film is metallized on both surfaces to form a carrier electrode for incorporation into the finished capacitor, two such carrier electrodes being shown in FIGS. 1 and 2.

In the manufacture of the capacitor, two carrier electrodes made by metallizing a polycarbonate film, on both surfaces as previously described, are convoluted by known methods into a cylinder 5 with non-metallized polystyrene films 7 and 16 having good dielectric properties interposed between the two carrier electrodes so as to insulate the two carrier electrodes from each other. Each non-metallized film extends from one edge to the opposite edge of the convolute or cylinder 5. In forming the convolute, the two carrier electrodes are preferably offset from each other so that the left edge of the carrier electrode 9 extends beyond the left edge of the carrier electrode 11 and the right edge of carrier electrode 11 extends beyond the right edge of carrier electrode 9. After the carrier electrode strips and the intervening polystyrene dielectric films are convoluted into the cylinder 5, the side edges of the cylinder are metallized, preferably by spraying, as shown at 13 and 15 so as to conductively join the metallized coating on the opposite surfaces of the polycarbonate film and thereby remove the polycarbonate from the electric field.

Although I prefer to use polystyrene as the dielectric separating the two electrodes, other dielectric films having good dielectric properties may be used in place of the polystyrene. The second non-metallized polystyrene film is designated by reference numeral 16 in FIGS. 1 and 2, and provides the outermost layer in the convolute 5.

Because the carrier electrodes are metallized from edge to edge, the metallized coatings on the opposite surfaces of the electrodes are conductively connected to each other by metal-spraying the side edges of the wound or convoluted capacitor, and the polycarbonate is removed from the electric field. This results in a capacitor that exhibits the same electric characteristics as a standard polystyrene-foil capacitor except that its temperature coefficient of capacitance is less negative; further it is self-healing even though the polystyrene is not directly metallized.

Self-healing in a directly metallized polystyrene film capacitor usually results in deterioration of the electrical properties, namely IR (insulation resistance) and DF (dissipation factor) of the capacitor due to conductive materials being formed at the clearing site. In the capacitor constructed in accordance with this invention, when a defect occurs, the defective site is isolated by the burning away of the carrier electrode metallized layer in intimate contact with the defect area in the polystyrene film, thereby avoiding the short circuit problem inherent in the metallized polystyrene type of capacitor. This is illustrated in FIG. 1 wherein the defect in the polystyrene is indicated at 17 with the area 19 in the carrier electrode burned away so as to isolate the area immediately below the defect in the dielectric film by means of the carrier electrode plastic film.

By constructing the capacitor in the manner before described, the capacitor not only is self-healing, but it retains the electrical characteristics of a standard polystyrene-foil capacitor. In addition, higher voltage stress (the product of capacitance and voltage) can be tolerated for a given dielectric thickness. A further advantage of capacitors made in accordance with the invention is that in capacitors of high capacity values, a volume reduction in the size of the capacitor of greater than 2 to 1 can be achieved with the same voltage rating. Another benefit flowing from the capacitor made in accordance with the invention is that the problem of deterioration of electrical properties, which is inherent in metallized polystyrene capacitors, is eliminated. Furthermore, improved moisture operating characteristics are achieved and DF and high IR are attained even when self-healing occurs.

Instead of convoluting the carrier electrodes with the polystyrene film therebetween into a cylinder, the capacitor can be made by superimposing alternate carrier electrodes and polystyrene dielectric file in layers so as to build up a multi-layered capacitor, and then spraying the edges with metal as described in connection with convoluted capacitor.

Figure 2:
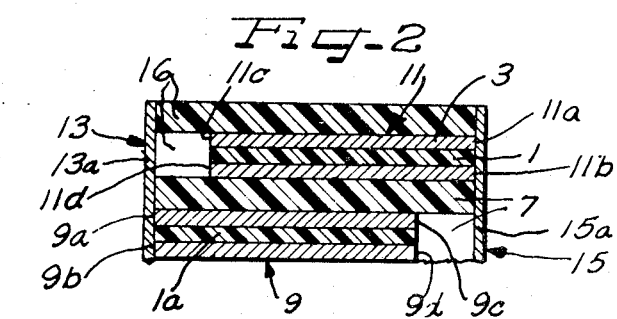
FIG. 2 is an enlarged cross-sectional view of one convolution of a capacitor made in accordance with the invention.
Figure 3:
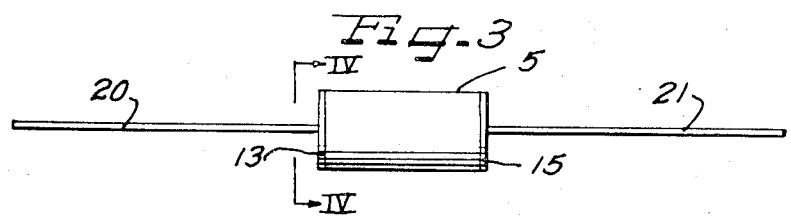
FIG. 3 is an elevation of the capacitor.
Figure 4:
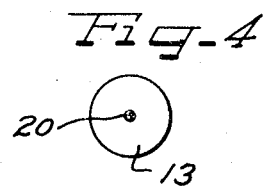
FIG. 4 is a cross-sectional view taken along the line IV—IV of FIG. 3.

It will, of course, be understood that suitable lead wires such as indicated at 20 and 21 in FIG. 3 will be fastened to the metallized side edges 13 and 15 of the capacitor in the manner well known in the art. The metallized side edges 13 and 15 make contact with the metal layers of carrier electrodes 9 and 11, respectively, regardless of the capacitor configuration. Metallized side edge portions 13a and 15a indicated in cross-section in FIG. 2 represent fragments of the side edges 13 and 15 of a convolute capacitor configuration as shown in FIGS. 3 and 4. As shown in FIG. 2, side edges 13 and 15 are continuously in conductive engagement with conductive margins 9a and 9b of carrier electrode 9, and conductive margins 11a and 11b of carrier electrode 11 respectively but spaced and electrically insulated from margins 11c and 11d, and 9c and 9d, respectively.

After the carrier electrodes 9 and 11 and the polystyrene dielectric films 7 and 16 are convoluted, the conductive side edges 13 and 15 may be formed as indicated in FIGS. 2–4, by spraying using either of two procedures. In one method, the convolute 5 can be heat treated before end spraying at a temperature sufficient to shrink the polystyrene films 7 and 16 around the inset ends 9c, 9d and 11c, 11d, and thereby to shield them from the metal spray thereafter applied. In another method, which is also applicable to flat capacitor configurations, angle spraying can be practiced without heat treating.

Capacitors have been made and satisfactorily operated having polycarbonate electrodes metallized on both surfaces with aluminum, each electrode having a thickness of 0.14 mil to 0.5 mil (1 mil = 0.001 inch), and having polystyrene dielectric sheets each 0.25 mil to 2 mil in thickness.

The present invention requires that the electrodes 9 and 11 be formed with nonporous polycarbonate dielectric material such as extruded or similarly processed polycarbonate film.

DISCUSSION OF NEW RESULTS PROVIDED BY THE PRESENT INVENTION

While the prior art teaches the use of capacitors with polycarbonate dielectric between metal electrodes, so far as applicant is aware, the prior art has taught that polycarbonate films should not be used as the so-called healing layer or carrier for the metal films of a carrier electrode. On the other hand, according to the present invention, a polycarbonate carrier electrode has been found superior to a Mylar carrier electrode in making possible the meeting of a commercial specification requiring a temperature stability of −50 ± 50 parts per million per degree Centigrade over a temperature range from 0° C. to 70° C.

It is found that the polycarbonate sheets 1 and 1a should be metallized from edge to edge since this assures meeting of the above temperature coefficient of capacitance (TCC). The following typical data comparing Mylar and polycarbonate for the carrier material shows the polycarbonate carrier electrode-polystyrene dielectric capacitor of the present invention with substantially all samples within tolerance while the comparable Mylar carrier electrode-polystyrene dielectric capacitor resulted in 84 percent of the parts out of the required tolerance range for temperature coefficient of capacitance, at a temperature of 70° C.

TABLE A

40 Gage (.40 mil) Polystyrene Dielectric, 25 Gage (.25 mil) Mylar Carrier

| Capacitance (pf.) 25°C | Capacitance (pf.) 70°C | Temperature Coefficient (PPM/°C) |
|---|---|---|
| 5138 | 5124 | −61 |
| 5125 | 5144 | +82 |
| 5108 | 5130 | +96 |
| 5060 | 5086 | +114 |
| 5106 | 5108 | +9 |
| 5137 | 5131 | −26 |
| 5071 | 5096 | +110 |
| 5119 | 5138 | +82 |
| 5058 | 5077 | +83 |
| 5094 | 5086 | −35 |
| 5123 | 5120 | −13 |
| 5090 | 5115 | +109 |
| 5079 | 5100 | +92 |
| 5079 | 5071 | −35 |
| 5119 | 5137 | +78 |
| 5110 | 5131 | +91 |
| 5082 | 5083 | +4 |
| 5066 | 5070 | +18 |
| 5082 | 5109 | +118 |
| 5111 | 5111 | 0 |
| 5100 | 5105 | +22 |
| 5141 | 5136 | −22 |
| 5113 | 5120 | +30 |
| 5122 | 5127 | +22 |

TABLE B

40 Gage (.40 mil) Polystyrene Dielectric, 24 Gage (.24 mil) Polycarbonate Carrier

| Capacitance (pf.) 25°C | Capacitance (pf.) 70°C | Temperature Coefficient (PPM/°C) |
|---|---|---|
| 4811 | 4795 | −74 |
| 4684 | 4667 | −81 |
| 5588 | 5567 | −84 |
| 5334 | 5322 | −50 |
| 4931 | 4911 | −90 |
| 5387 | 5378 | −37 |
| 5391 | 5371 | −82 |
| 5355 | 5335 | −83 |
| 5033 | 5015 | −79 |
| 5085 | 5070 | −66 |
| 5493 | 5479 | −57 |
| 5286 | 5272 | −59 |
| 5503 | 5496 | −28 |
| 5502 | 5497 | −20 |
| 5522 | 5509 | −52 |
| 5300 | 5290 | −42 |
| 5544 | 5529 | −60 |
| 5610 | 5604 | −24 |
| 5541 | 5530 | −44 |
| 5616 | 5608 | −32 |

Results comparable to those of Tables A and B were evident at low temperatures below 25° C. The foregoing results were for a capacitor type having a nominal capacitance of 5,100 picofarads, and a rated direct current voltage of 100 volts. The capacitance was measured at 1 kilohertz.

The capacitor of the present invention is particularly advantageous where the foregoing thermal characteristics plus a high degree of capacitance stability must be met for a capacitor having required relatively small physical dimensions, of 0.155 inch maximum diameter and 0.5 inch maximum length for the convolute itself, and correspondingly small dimensions of 0.175 inch maximum diameter and 0.625 inch maximum length for the finished capacitor. The tight dimensions specified precluded the possibility of a capacitor with different dielectrics selected to give the desired resultant temperature coefficient of capacitance.

Where the samples given in Table B, after heating to 70° C, were then cooled to 25° C again, the following values of capacitance were measured, giving the percentage change in capacitance (%ΔC), as indicated.

TABLE C

Capacitance Stability of 40 Gage Polystyrene Dielectric, 24 Gage Polycarbonate Carrier

| value of capacitance (pf.) at 25° C | value of capacitance (pf.) when subsequently cooled again to 25° C | Capacitance Change (%ΔC) |
| --- | --- | --- |
| 4810 | 4808 | −.04 |
| 4683 | 4681 | −.04 |
| 5589 | 5586 | .05 |
| 5333 | 5333 | 0 |
| 4932 | 4931 | −.02 |
| 5386 | 5386 | 0 |
| 5391 | 5389 | −.04 |
| 5355 | 5353 | −.04 |
| 5034 | 5031 | −.06 |
| 5080 | 5083 | +.06 |
| 5493 | 5492 | −.02 |
| 5284 | 5285 | +.02 |
| 5500 | 5502 | +.04 |
| 5501 | 5503 | +.04 |
| 5520 | 5518 | +.04 |
| 5298 | 5297 | −.02 |
| 5543 | 5541 | −.04 |
| 5607 | 5612 | +.09 |
| 5539 | 5538 | +.02 |
| 5612 | 5615 | +.05 |

I claim as my invention:

1. A self-healing capacitor comprising two carrier electrodes, each carrier electrode consisting of a sheet of non-porous polycarbonate film of a thickness of approximately 0.15 to 0.5 mil having high dielectric strength and low power factor with both surfaces completely metallized from edge to edge, a polystyrene dielectric film sandwiched between said carrier electrodes and a second polystyrene dielectric film overlying one of said carrier electrodes, said carrier electrodes being offset from each other so that the edge of one carrier electrode extends beyond the edge of the other carrier electrode, the polystyrene films extending to the outer carrier electrode edge on each side, the combined layers of carrier electrodes and polystyrene films being convoluted to form multiple electrode layers separated by polystyrene film, the sides of the resulting convolute being metallized to conductively join the metallized layers on the opposite surfaces of only one electrode on one side of the convolute and to conductively join the metallized layers on the opposite surfaces of only the other electrode on the opposite side of the convolute.

2. A self-healing capacitor comprising two carrier electrodes, each carrier electrode consisting of a sheet of plastic film with both surfaces substantially completely metallized from edge to edge, a dielectric film sandwiched between said carrier electrodes and a second dielectric film overlying one of said carrier electrodes, said carrier electrodes being offset from each other so that the edge of one carrier electrode extends beyond the edge of the other carrier electrode, the combined layers of carrier electrodes and dielectric films being convoluted to form multiple electrode layers separated by dielectric film, the sides of the resulting convolute being metallized to conductively join the metallized layers on the opposite surfaces of only one electrode on one side of the convolute and to conductively join the metallized layers on the opposite surfaces of only the other electrode on the opposite side of the convolute, said self-healing capacitor being characterized in exhibiting a stable temperature coefficient of capacitance not exceeding −50±50 parts per million per degree Centigrade over a temperature range from 0° centigrade to 70° Centigrade, and said carrier electrodes each consisting essentially only of nonporous polycarbonate dielectric sheet material and the conductively joined metallized layers on the opposite surfaces thereof, said nonporous polycarbonate dielectric sheet material of each carrier electrode having an interface directly with the metal of the associated metallized layers over substantially the entire extent of the opposite surfaces thereof.

* * * * *